Patented Sept. 19, 1950

2,522,569

UNITED STATES PATENT OFFICE 2,522,569

PREPARATION OF CATION ACTIVE RESINS

Harold M. Day, Cos Cob, Conn., and Ronald L. De Hoff, Flemington, N. J., assignors to American Cyanamid Company, New York, N. Y., a corporation of Maine No Drawing. Application June 11, 1946, Serial No. 676,096

4 Claims. (Cl. 260—49)

This invention relates to cation active synthetic resins and more particularly, to a cationic synthetic resin prepared from 4,4'-diphenylol dimethyl methane, formaldehyde and an alkaline sulfiting agent, to the method of preparing such a resin, and to the use of the resin for the removal of cations from, or the exchange of cations in, liquid media.

It is well known in the art that monohydroxy benzene, its homologues or its alkali metal salts may be condensed with formaldehyde and then treated with a sulfiting agent and that it may be treated with a sulfiting agent concurrently with condensation with formaldehyde to produce a cation active resin. These types of products are, for example, described in U. S. Patent No. 2,228,159. Similarly, U. S. Patent No. 2,191,853 describes the preparation of cationic synthetic resins by condensing a polyhydric phenol with formaldehyde and sulfiting the condensation product or by sulfiting the polyhydric phenol and condensing the resulting sulfited material with formaldehyde or by simultaneously condensing the three ingredients.

We have discovered that a cation active material may be prepared by bringing about reaction between 4,4'-diphenylol dimethyl methane which is neither a monohydroxy benzene nor a polyhydric phenol nor a homologue thereof, formaldehyde and a sulfiting agent if the sulfiting agent is alkaline.

The present invention will be described in greater detail in conjunction with the following specific examples in which the proportions are given in parts by weight. These examples are merely illustrative, and it is not intended that the scope of the invention be restricted to the details therein set forth.

Example 1

114 parts of 4,4'-diphenylol dimethyl methane (0.5 mol)
202.5 parts of 37% aqueous formaldehyde (2.5 mols)
63 parts of sodium sulfite.

The reactants are placed in a suitable vessel and heated at a temperature of about 95° C. until formation of a viscous syrup occurs. The syrup is dried in an oven at a temperature of about 150° C. for 18 hours. The resulting dried gel is granulated to a particle size of about 20–50 mesh and, upon evaluation, is found to have a capacity for removing cations from solution of about 16.0 kilograins of calcium carbonate per cubic foot of resin and a density of about 20.0 lbs./cu. ft.

Example 2

114 parts of 4,4'-diphenylol dimethyl methane (0.5 mol)
31.5 parts of sodium sulfite (0.25 mol)
26 parts of sodium bisulfite (0.25 mol)
202.5 parts of 37% of aqueous formaldehyde (2.9 mols)

A mixture of the ingredients is heated under a reflux condenser with good agitation until a viscous syrup is obtained. The syrup is pre-cured by heating for 16 hours at 100° C. and finally cured by heating for 16 hours at 150° C. The cured resin is ground, screened, and found upon evaluation to have a capacity of about 15.5 kilograins of calcium carbonate per cubic foot of resin and a density of 24.2 lbs./cu. ft.

Example 3

114 parts of 4,4'-diphenylol dimethyl methane (0.5 mol)
73 parts of sodium sulfite (0.58 mol)
235 parts of 37% aqueous formaldehyde (2.9 mols)

The formaldehyde is added to a mixture of the other two ingredients in a suitable vessel equipped with mechanical agitating means and a reflux condenser. An exothermic reaction occurs, and refluxing begins at a temperature of about 100° C. The refluxing is continued until a clear viscous syrup is obtained, about 1½ to 2 hours.

The syrup is pre-cured by heating for 16 hours at 100° C. and then finally cured for 16 hours at 150° C. The cured resin is then ground, screened and evaluated. It has a capacity for removing cations from solution of about 14.4 kilograins of calcium carbonate per cubic foot of resin and a density of 18.9 lbs./cu. ft.

Example 4

114 parts of 4,4'-diphenylol dimethyl methane (0.5 mol)
93 parts of sodium sulfite (0.74 mol)
299 parts of 37% aqueous formaldehyde (3.7 mols)

The procedure of Example 3 is followed. The resin obtained has a capacity of 13.2 kilograins of calcium carbonate per cubic foot of resin and a density of 15.3 lbs./cu. ft.

Example 5

342 parts of 4,4'-diphenylol dimethyl methane (1.5 mols)
189 parts of sodium sulfite (1.5 mols)
607.5 parts of 37% aqueous formaldehyde (7.5 mols)

The procedure of Example 3 is followed except that the resin is ground after the 16 hours pre-cure at 100° C. and washed thoroughly with 5% sulfuric acid. It is then finally cured for 16 hours at 125° C., ground, screened and evaluated. It has a capacity of 16.7 kilograins of calcium carbonate per cubic foot of resin and a density of 22.7 lbs./cu. ft.

*Example 6*

114 parts of 4,4'-diphenylol dimethyl methane (0.5 mol)
63 parts of sodium sulfite (0.5 mol)
202.5 parts of 37% aqueous formaldehyde (2.5 mols)

The procedure of Example 3 is followed except that the phenolic compound and the formaldehyde are first reacted together and the sodium sulfite added to the resulting syrup. The resin has a capacity of 12.4 kilograins of calcium carbonate per cubic foot of resin and a density of 17.8 lbs./cu. ft.

*Example 7*

114 parts of 4,4'-diphenylol dimethyl methane (0.5 mol)
63 parts of sodium sulfite (0.5 mol)
202.5 parts of 37% aqueous formaldehyde (2.5 mols)

The procedure of Example 3 is followed except that the sodium sulfite is first reacted with one-half the amount of the phenolic compound and of the formalin, and then the remainder of the phenolic compound and formalin is added. In addition, the resin is ground after it is pre-cured. The resin obtained after final curing has a capacity of about 13.7 kilograins of calcium carbonate per cubic foot of resin and a density of 19.9 lbs./cu. ft.

*Example 8*

210 parts of phenol (2.2 mols)
30 parts of acetone (0.5 mol)
21 parts of concentrated hydrochloric acid (37%)
90 parts of 10% sodium hydroxide solution
472 parts of formaldehyde (5.8 mols)
147 parts of sodium sulfite (1.2 mols)

The phenol, acetone and hydrochloric acid are mixed together in a suitable vessel and allowed to stand at a temperature of from 30°–40° C. until the mass crystallizes. The sodium hydroxide solution is added to neutralize the hydrochloric acid, and the formaldehyde and sodium sulfite are then added to the neutralized reaction mixture. The neutralized reaction mixture with the added formaldehyde and sodium sulfite is heated at about 100° C. until formation of a viscous syrup occurs, a period of about 2 hours. The syrup is dried in an oven at a temperature of about 125° C. for about 16 hours, after which the dried gel is granulated to a particle size of about 20–50 mesh. The granular product has a capacity for removing cations from solution of about 16.0 kilograins of calcium carbonate per cubic foot of resin and a density of about 20.0 lbs./cu. ft. of resin.

Any alkaline sulfiting agent may be used in place of the sodium sulfite of the examples. Such sulfiting agents include other alkali metal sulfites such as potassium sulfite, alkali metal bisulfites such as sodium metabisulfite, sodium bisulfite liquor, potassium bisulfite, etc. It will be apparent that mixtures of two or more of the sulfiting agents of the type listed above may be utilized in place of any single agent.

As will be apparent from the details of Example 8, the 4,4'-diphenylol dimethyl methane may be prepared by the reaction of phenol with acetone, and the crude reaction product used directly in the preparation of the resinous products of the present invention. Our invention, however, is in no sense limited to 4,4'-diphenylol dimethyl methane of any particular source or origin.

We prefer a molar ratio of formaldehyde to 4,4'-diphenylol dimethyl methane of about 5:1, but the invention is in no sense limited to this particular proportion. More formaldehyde generally produces a resin of no higher capacity while less formaldehyde may result in a more water-soluble product. In general, ratios of from 4:1 to 10:1, formaldehyde to phenolic compound, may be utilized.

We prefer to react the phenolic compound and the sulfiting agent in a 1:1 molar ratio. If more sulfiting agent is used the resulting resin has a tendency to swell badly, and if less sulfiting agent is used the resulting resin may be too water-soluble. However, the invention is in no sense restricted to this particular proportion and ratios of from 1.5:1 to 1:0.5, phenolic compound to sulfiting agent, may be used.

At least one molar proportion of formaldehyde must be reacted with the phenolic compound before it is sulfited since presumably only one of the methylol groups is sulfited in the final resin. Evidence for this is the recovery of one mol of sodium hydroxide for each mol of 4,4'-diphenylol dimethyl methane reacted. Accordingly, it is possible within the scope of the present invention to condense the 4,4'-diphenylol dimethyl methane, formaldehyde and sulfiting agent simultaneously or to condense the phenolic compound with the excess of formaldehyde and treat the resulting condensation product with the sulfiting agent. If desired, something less than the total amount of formaldehyde but at least an equimolar quantity thereof may be pre-condensed with the phenolic compound, that condensation product may be treated with a sulfiting agent, and the sulfited product then resinified with the remainder of the formaldehyde.

We have found it best to cure the cation exchange resins of the present invention at high temperatures, i. e., about 125°–150° C. If the resin is finally cured at a lower temperature it has a tendency to swell. It is desirable to pre-cure the resins at a lower temperature, about 100° C., but grinding the pre-cured resin before final curing has no particular advantage in that the resin so obtained does not have as good a capacity as one which is not ground between the pre-curing and final curing steps.

A resin of higher capacity may be obtained if the free alkalinity, due to the molar equivalent of sodium hydroxide liberated in the reaction for every mol of sulfiting agent used, is reduced. This may be accomplished by neutralization with an acid wash. The alkalinity may also be reduced by utilizing a mixture of bisulfite and sulfite as the sulfiting agent.

It is certain that the sulfur of the sulfite group is attached to an aliphatic carbon atom in the final resin; there is no nuclear sulfonation taking place under the conditions of the reaction.

While we do not wish to be limited to any particular theory as to mechanism of the formation of the cationic synthetic resins of the present invention, we believe that the reaction which occurs may be represented schematically as follows:

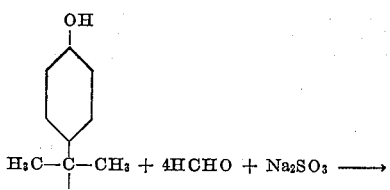

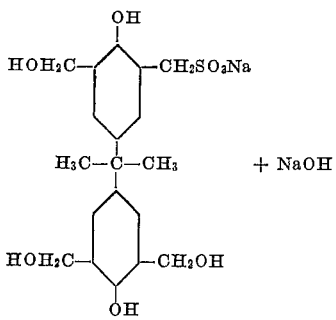

The formation of the 4,4'-diphenylol dimethyl methane from phenol and acetone may be represented as following the equation:

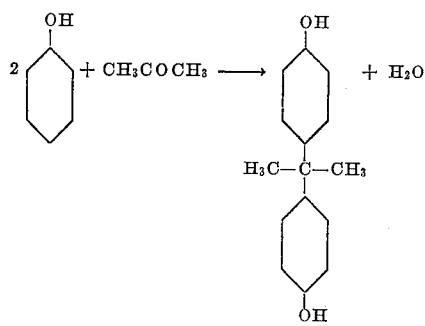

It is an advantage of the present invention that the granular, water-insoluble synthetic resins produced in accordance therewith are capable of exchanging cations in liquid media and of removing cations from liquid media. In this connection, our resinous materials may be used in admixture with other cation active materials or they may be used alone. Furthermore, our resins may be applied before gelation to a suitable carrier such as diatomaceous earth, clay, charcoal, etc. In this way, the active resin is spread on the surface of a relatively inert material and one is thus enabled to employ a smaller quantity of resin than otherwise to obtain the same active area.

Resinous materials prepared according to our invention are useful in the removal of cations from fluid media, especially aqueous solutions. The resins may be used in the hydrogen-activated form to remove cations from solutions of bases, and they may also be employed as exchange materials in accordance with the principles applied to the use of the natural and synthetic zeolites. Thus, the resin may be activated with a sodium salt such as sodium chloride and upon contact with a solution containing calcium, magnesium or other cations, an exchange of the latter ions for the sodium ions takes place.

The activating solutions or regenerating solutions for our resins are dilute acid solutions or dilute salt solutions, e. g., about 0.2%–10% of sulfuric acid, hydrochloric acid, sodium chloride, potassium chloride, etc.

To be sufficiently insoluble for practical use in the art of water purification, a resin should have a sufficiently low solubility that it will not be dissolved away rapidly by the solution to be treated. Thus, water should not dissolve more than about 1 part of resin in 1,000 parts of water when passed through a bed of resin (after the first cycle comprising an activation, exhaustion and reactivation of the resin).

It is preferable to grind and screen the resins to a particle size of from about 8–60 mesh. Use of larger particles causes channeling, and smaller particles of resin have been found to pack, thus reducing the cation exchange efficiency of the material.

Our resinous materials are useful for a wide variety of purposes. Some of the uses which may be mentioned by way of example are: water purification; purification of aqueous solutions containing sugar including sugar juices; purification of water from lead pipes; removal of heavy metal ions from food, beverages and pharmaceutical products; decolorization of solutions containing coloring matters, etc. Our condensation products may also be employed to recover valuable metal cations from dilute solutions, e. g., gold from sea water, chromium from chrome tanning liquors, silver from photographic baths, etc. Another important application of our materials is in the absorption or adsorption of gases such as ammonia, the amines, e. g., triethyl amine, methyl amine, etc., from fluid media, either dissolved in a liquid or from vapors.

We claim:

1. A granular, water-insoluble synthetic resinous material having a capacity for exchanging cations in liquid media and obtained by a process which comprises bringing about reaction between, as sole reactants, 4,4'-diphenylol dimethyl methane, formaldehyde and an alkaline sulfiting agent in molar proportions of from 4:1 to 10:1, formaldehyde to 4,4'-diphenylol dimethyl methane, and from 1.5:1 to 1:0.5, 4,4'-diphenylol dimethyl methane to sulfiting agent, heating the reaction product obtained until formation of a viscous syrup occurs, curing the syrup by heating, and granulating the cured material to a particle size of from 8 to 60 mesh.

2. A process in accordance with claim 4 which includes the steps of first condensing the 4,4'-diphenylol dimethyl methane with at least an equimolar proportion of the formaldehyde and then reacting the condensation product with the alkaline sulfiting agent.

3. A process in accordance with claim 4 which comprises simultaneously condensing the 4,4'-diphenylol dimethyl methane, formaldehyde and an alkaline sulfiting agent.

4. A process which comprises bringing about reaction between, as sole reactants, 4,4'-diphenylol dimethyl methane, formaldehyde and an alkaline sulfiting agent in molar proportions of from 4:1 to 10:1, formaldehyde to 4,4'-diphenylol dimethyl methane, and from 1.5:1 to 1:0.5, 4,4'-diphenylol dimethyl methane to sulfiting agent, heating the reaction product obtained until formation of a viscous syrup occurs, curing the syrup by heating, and granulating the cured material to a particle size of from 8 to 60 mesh.

HAROLD M. DAY.
RONALD L. DE HOFF.

(References on following page)

REFERENCES CITED

The following references are of record in the file of this patent:

UNITED STATES PATENTS

| Number | Name | Date |
|---|---|---|
| 1,225,749 | Beatty | May 15, 1917 |
| 2,357,798 | Niederhauser et al. | Sept. 12, 1944 |
| 2,373,547 | D'Alelio | Apr. 10, 1945 |
| 2,373,548 | D'Alelio | Apr. 10, 1945 |
| 2,373,549 | D'Alelio | Apr. 10, 1945 |

FOREIGN PATENTS

| Number | Country | Date |
|---|---|---|
| 823,808 | France | Oct. 25, 1937 |